United States Patent [19]

Bissar

[11] 4,297,006
[45] Oct. 27, 1981

[54] PROTECTIVE MEMBRANE FOR ELECTROCHROMIC DISPLAYS

[75] Inventor: Saadi J. Bissar, Waterbury, Conn.

[73] Assignee: Timex Corporation, Waterbury, Conn.

[21] Appl. No.: 77,863

[22] Filed: Sep. 21, 1979

Related U.S. Application Data

[63] Continuation-in-part of Ser. No. 973,833, Dec. 28, 1978, abandoned.

[51] Int. Cl.³ .............................................. G02F 1/17
[52] U.S. Cl. .................................................... 350/357
[58] Field of Search ......................................... 350/357

[56] References Cited

U.S. PATENT DOCUMENTS

| | | | |
|---|---|---|---|
| 4,115,631 | 9/1978 | Deb | 350/357 X |
| 4,120,568 | 10/1978 | Deb et al. | 350/357 |
| 4,170,406 | 10/1979 | Giglia et al. | 350/357 |
| 4,174,152 | 11/1979 | Giglia et al. | 350/357 |
| 4,240,713 | 12/1980 | Leibowitz | 350/357 |

Primary Examiner—James W. Davie

[57] ABSTRACT

The invention provides a protective and heat resisting membrane for application onto electrochromic layers and/or leads in an electrochromic display to prevent dissolution and erosion thereof as a result of contact with the display electrolyte. The membrane typically comprises (a) a long chain organic acid, preferably a water insoluble carboxylic acid, (b) optional acid resistant epoxy resin and (c) a compound selected from at least one of an amine and amide in sufficient amount to form the respective amino or amido salt of the acid, which salt together with any epoxy resin present, imparts water repellency and ionic conductivity to the membrane, and with the amine or amide being present in less than the amount required to fully cure any epoxy resin present with time and temperature so that only a minor, dispersed portion of the resin is cured. Curing of a minor, dispersed portion of the resin improves adherence and does not adversely affect the ionic conductivity of the membrane.

25 Claims, 2 Drawing Figures

PROTECTIVE MEMBRANE FOR ELECTROCHROMIC DISPLAYS

This application is a continuation-in-part application of U.S. Ser. No. 973,833 filed Dec. 28, 1978, now abandoned.

FIELD OF THE INVENTION

The present invention relates to electrochromic displays, and more particularly, to means such as membranes, films and the like to be applied onto the electrochromic layers to protect them from degradation by the display electrolyte.

DESCRIPTION OF THE PRIOR ART

Electrochromic displays are well known in the art and typically comprise a front substrate with selectively actuable transparent electrodes and image-forming electrochromic layers thereon, a rear substrate spaced from the front substrate and having a counter electrode thereon and an ion-conducting electrolyte layer between the substrates. Although many electrochromic materials exist which are useful in these displays, tungsten trioxide alone or admixed with other materials is by far the most widely used. Generally, in prior art electrochromic displays, coloration of the image-forming electrochromic layers of tungsten trioxide is thought to proceed by the following reversible reaction.

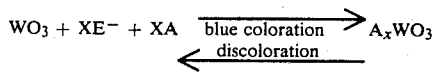

where A is $H^+$ or other cations such as $Li^+$. Representatives of this or similar types of displays are the Witzke patents, U.S. Pat. No. 3,840,287 issued Oct. 8, 1974; the Giglia patent, U.S. Pat. No. 3,973,829 issued Aug. 10, 1976; the Berets patent, U.S. Pat. No. 3,843,232 issued Oct. 22, 1974; and the Leibowitz patent, U.S. Pat. No. 4,021,831 issued Mar. 22, 1977.

A disadvantage associated with these types of electrochromic displays is that their useful life has been somewhat limited as a result of degradation of the electrochromic layers. In one failure mode, the electrochromic layer dissolves in the electrolyte with operating time and temperature as a result of the electrochromic material passing through various intermediate valence or oxidation states during coloration and bleaching during which it is quite soluble in the electrolyte. Liquid electrolyte containing water and free acid has been observed to cause severe erosion or dissolution of the electrochromic layers with time and temperature. As a result, some prior art devices have employed gels, pastes, ion-conductive solids and ion-exchange resins to minimize the presence of water in the display. Other attempts by prior art workers to alleviate this problem are exemplified in the Giglia patent, U.S. Pat. No. 3,970,365 issued July 20, 1976; and the Leibowitz patents U.S. Pat. Nos. 3,957,352 and 4,012,831, issued May 18, 1976 and Mar. 22, 1977 respectively, the latter two of which teach that a reduction in dissolution of the electrochromic layers can be achieved by adding certain components to the electrolyte with which the layers are in contact. In copending U.S. patent application Ser. No. 953,716 now U.S. Pat. No. 4,233,339 entitled "Electronic Films Having Improved Etch Resistance And Method for Making Same" filed Oct. 23, 1978 in the names of Richard Crandall, Brian Fanghnan, and Marshall Leibowitz as joint inventors, the resistance of the electrochromic layers to dissolution is increased by heat treating the layers at a selected temperature at or above the crystallization temperature of the electrochromic material for a selected short time to convert at least the free surface portion of each layer in contact with the electrolyte from the amorphous to the crystalline form while preventing excessive water loss from the layer.

A somewhat different attempt to solve the problem of erosion of the electrochromic layers by the display electrolyte is represented by the Deb et al U.S. Pat. No. 4,120,568 issued Oct. 17, 1978. This patent provides a protective overcoat layer between the electrolyte and electrochromic layer to prevent contact therebetween. The protective overcoat layer is said to comprise a substantially insulating dielectric layer, exemplary of which is a tin oxide layer of 100 A to 1000 A thickness and doped with antimony. Other useful layers are said to be silicon oxide, titanium oxide or chromium nitride doped with gold.

SUMMARY OF THE INVENTION

The present invention relates to a protective membrane for application onto one or more electrochromic layers in an electrochromic display to prevent erosion, dissolution or other degradation thereof as a result of contact with the display electrolyte. The protective membrane is also heat resistant in that heating thereof during a subsequent display assembly operation, e.g. curing of the display seal, or during the operation of the display in elevated temperature environments does not degrade the protective or other properties, such as ionic conductivity, of the membrane.

In a typical embodiment of the invention, the protective and heat resisting membrane comprises a mixture of a long chain organic acid, preferably a substantially water insoluble organic acid, an optional epoxy resin and a compound selected from amine, amide, or combinations thereof. An important feature of the invention is that the amine or amide compound is present in a sufficient amount to form the respective amino or amido salt with the organic acid which salt, together with any epoxy resin present, imparts water repellency and ionic conductivity to the membrane. For example, when the organic acid is a water insoluble carboxylic acid such as adipic, dodecanedioic, lauric, stearic, palmitic, or oleic acid, the salt corresponds to adipamino or adipamido, etc. which are mucous-like products. It is thought that the mucous-like salt, and any epoxy resin present, form a film network throughout the membrane to repel the water or other liquid of the electrolyte. Any excess (unreacted) acid contributes to the ionic conductivity of the membrane. When epoxy resin is present, another important feature of the invention is that the amine or amide compound is present in less than the amount required to completely cure the epoxy resin so that with time and temperature only a minor portion of the resin is cured. In this way, the cured resin is dispersed throughout the membrane so that the adherence of the membrane to the electrochromic layers is enhanced while the ionic conductivity of the membrane is not adversely affected for display purposes. When water insoluble carboxylic organic acids are employed in the membrane, the epoxy resin is not essential but preferably is included to increase the ionic conductivity and adherence of the membrane.

In a preferred embodiment of the invention, the membrane mixture also includes pigment in the form of flakes, particles and the like to impart the desired background color to the membrane.

The membrane of the invention can be applied to the electrochromic layers as an already formed film or sheet or it can be formed in situ on the layers by spraying, casting or otherwise applying the mixture to the layers. In a preferred method the components of the membrane mixture are dissolved in alcohol and the resulting solution sprayed onto the electrochromic layers followed by partial curing if epoxy resin is present.

Another aspect of the invention is that dilute acidified aqueous solutions containing up to about 95% water and exhibiting excellent ionic conductivity can be employed as the display electrolyte without harmful effects upon the electrochromic layers or metallic oxide leads.

DESCRIPTION OF THE DRAWINGS

Other objects and advantages of the invention may be seen from the following description when viewed in conjunction with the accompanying drawings wherein.

DESCRIPTION OF THE PREFERRED EMBODIMENT

Figure 1:
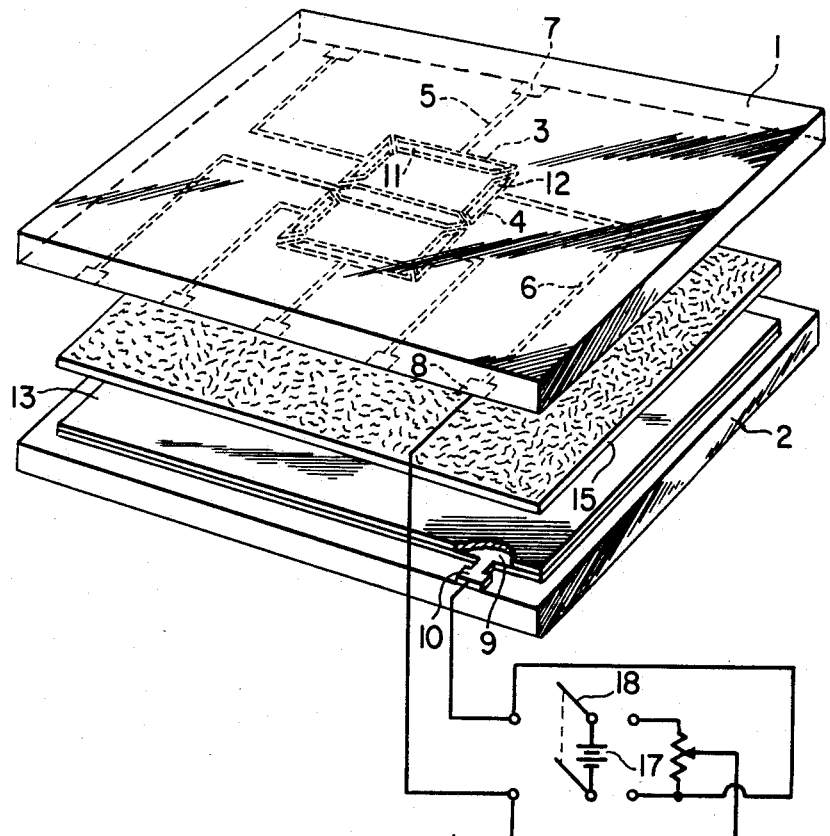
FIG. 1 is an exploded perspective view of a conventional electrochromic display.

Referring now to FIG. 1 of the drawings, a conventional electrochromic display having a sandwich construction of a first transparent substrate 1 and a second spaced substrate 2, which need not be transparent, and electrolyte layer 15 therebetween is shown. Substrate 1 has a conductive pattern of transparent metal oxide electrodes on the underside thereof, such as segments 3,4 of a pattern which can be selectively actuated to form digits or other optical patterns via conductive metal oxide leads 5,6 leading to terminals 7,8. Substrate 1 may be of transparent glass or plastic with a selected pattern of transparent electrodes 3,4 thereon of a metal oxide such as, for example, tin oxide or indium oxide admixed with a dopant such as antimony oxide to increase conductivity. The pattern may be etched on the substrate by using a commercially available material known as NESA glass and removing the conductive coating except for electrodes 3,4.

The second substrate has a conductive counter electrode 9 thereon. Substrate 2 may be made of glass, ceramic or plastic coated with a suitable conductive layer to form counter electrode 9 connected to terminal 10. Coated on the transparent electrode segments 3,4 and also on counter electrode 9, if desired, are layers of electrochromic material indicated as 11,12,13. The electrochromic layers 11, 12 on segments 3,4 respectively, are applied by suitable masking techniques to cover a smaller area than the electrodes so as to give good edge definition.

Figure 2:
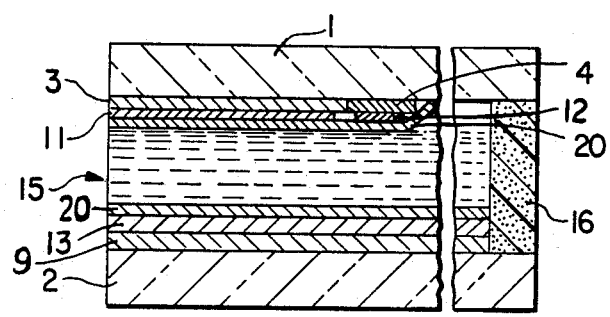
FIG. 2 is an enlarged cross-sectional view of the inventive display showing the protective membrane placed onto the electrochromic layer of FIG. 1.

In accordance with the present invention, a protective and heat resisting membrane 20 is disposed on the electrochromic layers, e.g. layers 11,12,13 of FIG. 2, to prevent dissolution, erosion or other degradation resulting from contact between electrolyte layer 15 and the electrochromic layers. The membrane comprises a mixture of a long chain organic acid, an optional acid resistant epoxy resin, a compound selected from at least one of amine and amide and preferably pigment in the form of $TiO_2$, $ZrO_2$, etc. particles or flakes to impart a white or other colored background to the membrane. Each component of the membrane mixture plays a specific function in the membrane's performance in the display. The organic acid is utilized to impart water repellency and ionic conductivity to the membrane by reaction, as hereinafter described, with the amine or amide to form a mucous-like salt. Unreacted (excess) acid functions to further ionic conductivity of the membrane. Long chain organic acids are preferred because they contribute to better adherence of the membrane. The most preferred long chain acids for use in the membrane mixture are the water insoluble type, for example, carboxylic acids including adipic, dodecanedioic, lauric (dodecaneoic), stearic (octadecanoic), palmitic, and oleic acids. These particular acids are advantageous in the membrane formulation as a result of their substantial insolubility in water which, as will be discussed hereafter, may comprise the major component of the electrolyte. These specific water insoluble organic acids are available commercially in powder form with the exception of oleic acid which is provided in liquid form. The preferred membrane of the invention includes two or more of these water insoluble carboxylic acids, at least one of which is oleic acid.

Polymeric acids such as polystyrene sulfonic acid, although soluble in water and thus less preferred, may also be useful for their excellent ionic conductivity and ready availability, as for example, TL 71 and TL 121 available from National Starch Co. Of course, the particular acid chosen for the membrane depends upon several factors including its ionic conductivity and solubility and adherence properties of the membrane with any given electrolyte.

Mineral acids, such as sulfuric acid, may be present along with the organic acid as impurities or intentional additions. For example, commercially available polystyrene sulfonic acid includes some small quantity of sulfuric acid therein as an impurity.

As already mentioned, the presence of epoxy resin in the membrane is optional, particularly when the aforementioned water insoluble carboxylic acids are used. However, when present, the primary functions of the epoxy resin are to provide adherence of the membrane to the substrate 1,2 and the electrochromic layers thereon and to cooperate with the salt of the organic acid in imparting water repellency, ionic conductivity and adherence to the membrane. Ionic conductivity of the membrane is favorably affected by the presence of the epoxy resin. As will become apparent hereinafter, it is important that the major portion of the epoxy resin in the membrane remain in the uncured state whereas only a minor dispersed portion is cured. By curing only a minor dispersed portion of the resin, the adherence of the membrane is enhanced and yet the ionic conductivity of the membrane is not adversely affected. The remaining uncured resin is free to provide water repellency in conjunction with the salt of the organic acid. Alhough other epoxy resins may be utilized in the invention, the preferred resin is selected from the epoxide types such as diglycidil ether of bisphenol A for purposes also to be made evident hereinafter.

The quantity of the amine or amide (including polyamine or polyamide) present in the mixture is highly important to the success of the membrane, with or without epoxy resin present. These compounds must be present in a sufficient minimum amount to form the respective amino or amido salt with the organic acid, the salt being mucous-like and imparting water repellency and ionic conductivity to the membrane. However, the amount of amine or amide (both of which function also as curing agents with respect to the epoxy resin) should be limited to less than the amount required to completely cure any epoxy resin present in the mixture. Although not wishing to be bound by theory, it is believed that the amino or amido salt of the acid, along with any uncured epoxy resin present, form a film network throughout the membrane which network is water repellent and also ion conductive. For example, when adipic acid is present in the mixture, the salt is thought to comprise either adipamine or adipamide which is a mucous-like reaction product. When the membrane of the invention is viewed under a low power microscope (40X), the uncured epoxy resin appears to form what might be referred to as a "spider" net with the amino or amido salt spread over the webbing of the epoxy "spider" net. This amino or amido salt film is believed to be responsible, at least in part, for the water repellency of the membrane. In addition, it is thought that some of the amine or amide combines with the free radical of the acid, e.g. sulfate radical if sulfuric acid is present, to form amino or amido sulfates. These sulfates are also thought to contribute to the water repellency of the membrane. Additionally, some quantity of the amine or amide also combines with the electrochromic layer; e.g. $WO_3$, to form an amino or amido tungstate film which also contributes to membrane protectiveness.

The upper limit on the amount of amine or amide in the mixture must be strictly observed especially when epoxy resin is present in the membrane. Curing agents and epoxide resins are usually mixed in a ratio varying from 13 to 133 parts hardener to 100 parts epoxide. If mixed within that ratio, the mixture could fully cure and harden with time and temperature. In the membrane, if the amine or amide compound (curing agent) and the epoxide are present within the above ratio, the conductive epoxide will be fully cured if the display is subsequently heated to cure the seal or during operation at elevated temperatures, and the ionic conductivity through the membrane will be substantially harmed. However, if the ratio of amine or amide is below 13 parts over 100 parts epoxide, the resin in the membrane is only partly cured, the cured portion being dispersed generally throughout the membrane so that the ionic conductivity is not adversely affected. Dispersal of the cured epoxy resin has been found beneficial from an adherence standpoint to minimize peeling, bubbling and other defects of the membrane during display operation. Thus, the membrane of the invention is not only protective to the electrochromic layers but also is heat resisting in that subsequent heating for curing the seal or during display operation does not degrade the ionic conductivity, protectiveness, or other properties of the membrane. As indicated, curing of a minor, dispersed portion of the resin is actually advantageous from an adherence standpoint.

Of course, those skilled in the art will recognize that the amount of amine or amide allowable in the mixture will vary with the type of epoxy used and other factors. In addition, since some amount of the amine or amide combines with any free mineral acid present or with the electrochromic layer, as discussed hereinabove, the total quantity of amine or amide present initially in the mixture may be greater than the theoretical stoichiometric quantity required for complete curing and still maintain the heat-resisting characteristics of the membrane. The particular amounts of amine or amide thus tolerable in the mixture will vary and can be readily determined by those skilled in the art.

Amines and amides, including polyamines and polyamides, of various well known and commercially available types are useful in the membrane. Preferred, however, are those generally having an amine number in the range 300 to 400.

The following Examples will illustrate membrane compositions and fabrication procedures in more detail.

EXAMPLE I

A membrane was formed by mixing the following components in a 50 ml. solution of isopropanol:

| | |
|---|---|
| Dodecanedioic acid (available from E.I. DuPont de Nemours & Co.) | 2.5 gms |
| Polyamide V15 (made by Shell Oil Co.- Amine Number = 360) | 125 mgms |
| $ZrO_2$ pigment | 15 gms. | in the following manner. The dodecanedioic acid in powdered form is introduced into a 50 ml. capacity beaker followed by the addition of 30 ml. of isopropanol. These ingredients are stirred vigorously for about 30 minutes until the acid dissolves in the alcohol. During continued sirrring, a 10 ml. solution of the alcohol containing 125 mgms V15 is slowly introduced. A cloudy, mucous-type polyamido salt is formed. The solution is stirred vigorously for 30 minutes and $ZrO_2$ pigment is gradually added, followed by topping off with sufficient alcohol to make a 50 ml. solution. A small amount such as one drop of concentrated sulfuric acid can be added to the solution for improved adherence. While the solution is stirred to keep the $ZrO_2$ pigment in suspension, the solution is sprayed onto glass substrates carrying tungsten oxide electrochromic layers atop tin oxide electrode layers. Spraying utilizes a commercial-type air brush with nitrogen as the propellant to obtain a homogenous and uniform film. After spraying, the glass substrates can be air dried or gently heated in a 60° C. oven to form a protective membrane from 3–6 mils in thickness.

EXAMPLE II

A membrane was formed by mixing the following components in a 50 ml. solution of isopropanol:

| | |
|---|---|
| Dodecanedioic acid | 2.5 gms. |
| Polyamide V15 | 125 mgms |
| Epon 812 (epoxide made by Shell Oil Co.) | 3 gms. |
| $ZrO_2$ | 15 gms. | in a similar manner as Example 1 with the Epon 812 being introduced into the solution after the Polyamide V15 is added. Spraying and drying of the solution on glass substrates is conducted as described in Example I. Partial curing of the epoxy resin in the membrane is effected during curing of the display seal at a temperature of 65° C. or in a separate step, as desired.

EXAMPLE III

A protective and heat resisting membrane was formed by mixing the following components in a 50 ml. solution of isopropanol:

| | |
|---|---|
| Dodecanedioic acid | 2.5 gms |
| Oleic acid | .5 gms |
| Polyamide V15 | 125 mgm. |
| Epon 812 | 3 gms. |
| $ZrO_2$ | 15 gms. | in the same manner as Example 2 with the oleic acid in liquid form being added after the dodecanedioic acid is placed in the beaker. An electrochromic display like that described hereinabove with the membrane of Example III covering the electrochromic layers and leads was operated in a 60° C. oven for over 3 months with no visible deterioration of the tungsten oxide electrochromic layers or tin oxide leads.

Of course, in Examples I–III, dodecanedioic acid could be replaced by adipic, lauric, stearic, palmitic, oleic or other suitable water insoluble carboxylic or long chain organic acids. Generally, the carboxylic acids in powdered form are present in amount from 1 to 4 gms while oleic acid is present from 0.5 to 3 gms. Polyamide V15 can be used in amounts generally from 110 to 140 mgm while the epoxy resin ranges from 0–4 gms when present.

EXAMPLE IV

A membrane was formed by mixing the following components in a 50 ml. solution of isopropanol:

| | |
|---|---|
| TL 71 (polystyrene sulfonic acid manufactured by National Starch Co.) | 3 gm. |
| Polyamide V15 | 125 mgm. |
| Epon 812 | 3 gm. |
| $ZrO_2$ pigment | 15 gm. | in the following manner. The polystyrene sulfonic acid (TL 71) is supplied by the manufacturer in the form of a 30% solution in water. The solution is first evaporated and dried. Then, a 10% weight solution is prepared in dry isopropanol. To a 50 ml. capacity jar containing 30 ml. of the above solution is added 10 mls. (1.25% by weight) polyamide V15 while stirring. A cloudy, mucous type polyamido polystyrene sulfonate salt is thereby formed. After stirring for 10–15 minutes, 3.0 gr. Epon 812 dissolved in 10 ml. isopropanol is slowly added. After stirring for another 10–15 minutes, a white pigment of $ZrO_2$ is gradually added. The membrane solution is ready for spraying in about one-half hour after addition of the pigment. While the solution is stirred to keep the $ZrO_2$ particles in suspension, the solution is sprayed onto the glass substrates carrying the electrochromic layers thereon. Spraying utilizes the above commercial-type air brush with nitrogen as the propellent and a homogeneous and uniform film is obtained. After spraying, the glass substrates can be air dried or gently heated in a 60° C. oven. Partial curing of the epoxide resin of the membrane is effected during curing of the seal of the display, for example, at a temperature of 65° C., or in a separate step, as desired. Typical membrane thickness found satisfactory range from 3 to 6 mils.

EXAMPLE V

The membrane was formed by mixing the following components in a 50 ml. solution of isopropanol:

| | |
|---|---|
| TL 71 | 3 gm. |
| Polyamide V15 | 140 mgm. |
| Epon 812 | 2.5 gm. |
| Epon 813 (epoxide made by Shell Oil Co.) | 0.5 gm. |
| $ZrO_2$ | 15 gm. | in a manner similar to that described for Example I.

An important feature of the procedure set forth in Examples IV and V is that the epoxide resin, specifically Epon 812 was 100% soluble in the alcohol. This was quite surprising since epoxies in general were thought to be only partially soluble at best in the alcohol solution. Epon 813 on the other hand was essentially insoluble. However when added to the alcohol solution, it formed a colloidal suspension which made it feasible to use the Epon 813 in the membrane. The membrane made with the combination of Epon 812 and 813 was found to provide somewhat better adhesion to the glass substrate than the membrane made with only Epon 812.

The protective and heat resisting membrane of the invention can be formed directly on the glass substrates carrying the electrochromic layers by spraying, casting or otherwise coating the surface. These techniques provide optimum adherence and uniformity of the membrane. However, it may also be possible to preform the membrane and simply place it onto the substrate in sandwich fashion.

It will now be apparent to those skilled in the art that the membrane of the invention provides a protective shield against dissolution of the electrochromic layers and metallic oxide leads while attaining excellent switching speed, resistance to reasonably high manufacturing and operating temperatures and a white or other background color to highlight the image formed by activated electrochromic layers and hide the counter electrode.

The membrane of the invention also allows a greater flexibility in the type of electrolyte layer 15 used in the display. For the first time, acidified aqueous electrolytes, for example, containing up to 95% water with the balance acid, preferably 5–15% acid, can be used while retaining long display life. These types of aqueous electrolytes are preferred and advantageous as a result of their excellent ionic conductivity and inexpensive ingredients and manufacture. Furthermore, the display seal which may be plastic and the oxide leads are subject to much less attack by the dilute acid and the membrane itself retains its white color without yellowing caused by the use of the more concentrated acid solutions of the prior art. However, other electrolyte layers including, but not limited to, gelled electrolytes, paste electrolytes, ion-conducting solids and ion exchange resins may be used if desired. Polymeric acids such as polystyrene sulfonic acid are also usable as a result of their good ionic conductivity and minimal safety hazard from leakage of the electroyte.

Reference to FIG. 2 shows the assembled display with protective membranes 20 on both substrates 1,2. The two substrates are attached to one another by an adhesive 16, such as epoxy, and the electrolyte is incorporated into the display in conventional manner. As already mentioned, curing of the minor dispersed portion of the epoxy resin in the membrane can be effected during curing of the epoxy adhesive seal 16, in a separate heating step or during normal operation of the display. After filling, substrates 1,2 are sealed with adhesive or the like in the fill port region. Suitable well-known means for actuating the display element includes means for applying an electric field from a battery 17 to a selected segment 4 via terminal 8 and counter electrode 9 via terminal 10. Means for reversing the polarity of the applied voltage to erase the image is indicated symbolically by a two-pole double throw switch 18.

While there has been described what is considered to be the preferred embodiment of the invention, other modifications will occur to those skilled in the art and it is desired to cover in the appended claims all such modifications as fall within the true spirit and scope of the invention.

I claim:

1. An electrochromic display having a display electrode with an electrochromic layer thereon, a counter electrode spaced from the display electrode and display electrolyte between the electrochromic layer and counter electrode, characterized in that a protective membrane is interposed between the electrochromic layer and electrolyte for protecting the layer from erosion resulting from contact with the electrolyte, said membrane comprising a mixture of:
   (a) a long chain organic acid; and
   (b) a compound selected from at least one of amine and amide present in an effective amount to form a salt with the organic acid imparting water repellency and ionic conductivity to said membrane for minimizing contact between said electrochromic layer and electrolyte while maintaining ionic conductivity therebetween for display purposes.

2. The electrochromic display of claim 1 wherein the long chain organic acid of the membrane is substantially insoluble in water.

3. The electrochromic display of claim 2 wherein the water insoluble long chain organic acid is a carboxylic acid.

4. The electrochromic display of claim 3 wherein the carboxylic acid is selected from the group consisting of adipic, dodecanedioic, lauric, stearic, palmitic and oleic acid.

5. The electrochromic display of claim 4 wherein at least two substantially water insoluble carboxylic acids are employed in the membrane, one of which is oleic acid.

6. The electrochromic display of claim 1 wherein the long chain organic acid of the membrane is a polymeric acid.

7. The electrochromic display of claim 6 wherein the polymeric acid is polystyrene sulfonic acid.

8. The electrochromic display of claim 1 wherein the membrane includes pigment to impart a desired color thereto.

9. An electrochromic display having a display electrode with an electrochromic layer thereon, a counter electrode spaced from the display electrode and dispaly electrolyte between the electrochromic layer and counter electrode, characterized in that a protective membrane is interposed between the electrochromic layer and electrolyte for protecting the layer from erosion resulting from contact with the electrolyte, said membrane comprising a mixture of:
   (a) a long chain organic acid which is substantially insoluble in water;
   (b) epoxy resin; and
   (c) a compound selected from at least one of amine and amide present in an effective amount to form a salt with the organic acid with the salt and epoxy resin imparting water repellency and ionic conductivity to said membrane for minimizing contact between said electrochromic layer and electrolyte while maintaining ionic conductivity therebetween, said compound being present in less than the amount required to fully cure the epoxy resin so that with time and temperature only a minor, dispersed portion of said resin in cured, whereby the adherence of the membrane is enhanced without adversely affecting the ionic conductivity for display purposes.

10. The display of claim 9 wherein the substantially water insoluble organic acid of the membrane is a carboxylic acid.

11. The display of claim 10 wherein the carboxylic acid is selected from the group consisting of adipic, dodecanedioic, lauric, stearic, palmitic and oleic acid.

12. The display of claim 11 wherein at least two substantially water insoluble carboxylic acids are employed in the membrane, one of which is oleic acid.

13. The display of claim 9 wherein the membrane includes pigment to impart a desired color thereto.

14. An electrochromic display having a display electrode with an electrochromic layer thereon, a counter electrode spaced from the display electrode and display electrolyte between the electrochromic layer and counter electrode, characterized in that a protective membrane is interposed between the electrochromic layer and electrolyte for protecting the layer from erosion resulting from contact with the electrolyte, said membrane comprising a mixture of:
   (a) a substantially water insoluble carboxylic acid; and
   (b) a compound selected from at least one of amine and amide present in an effective amount to form a salt with the carboxylic acid imparting water repellency and ionic conductivity to said membrane for minimizing contact between said electrochromic layer and electrolyte while maintaining ionic conductivity therebetween for display purposes.

15. The display of claim 14 wherein the carboxylic acid is selected from the group consisting of adipic, dodecanedioic, lauric, stearic, palmitic and oleic acid.

16. The display of claim 15 wherein at least two substantially water insoluble carboxylic acids are employed in the membrane, one of which is oleic acid.

17. The display of claim 14 wherein the membrane includes pigment to impart color thereto.

18. An electrochromic display having a display electrode with an electrochromic layer thereon, a counter electrode spaced from the display electrode and display electrolyte between the electrochromic layer and counter electrode, characterized in that a protective membrane is interposed between the electrochromic layer and electrolyte for protecting the layer from erosion resulting from contact with the electrolyte, said membrane comprising a mixture of:
   (a) a substantially water insoluble carboxylic acid;
   (b) epoxy resin; and
   (c) a compound selected from at least one of amine and amide present in an effective amount to form a salt with the organic acid with the salt and epoxy resin imparting water repellency and ionic conductivity to said membrane for minimizing contact between said electrochromic layer and electrolyte while maintaining ionic conductivity therebetween, said compound being present in less than the amount required to fully cure the epoxy resin so that with time and temperature only a minor, dispersed portion of said resin is cured, whereby the adherence of the membrane is enhanced without adversely affecting the ionic conductivity for display purposes.

19. In an electrochromic display, a protective membrane to prevent erosion of the electrochromic layer by contact with the display electrolyte, comprising:
   (a) a substantially water insoluble carboxylic acid; and
   (b) a compound selected from at least one of the amine and amide in effective amount to form the respective amino or amido salt of the carboxylic acid, which salt imparts water repellency and ionic conductivity to the membrane for minimizing contact between said electrochromic layer and electrolyte while maintaining conductivity therebetween.

20. In an electrochromic display, a protective membrane to prevent erosion of the electrochromic layer by contact with the display electrolyte, comprising:
   (a) a substantially water insoluble carboxylic acid selected from the group consisting of adipic, dodecanedioic, lauric, stearic, palmitic, and oleic acid; and
   (b) a compound selected from at least amine and amide and present in effective amount to form the respective amino or amido salt of the acid, which salt imparts water repellency and ionic conductivity to the membrane for minimizing contact between said electrochromic layer and electrolyte while maintaining conductivity therebetween.

21. In an electrochromic display, a protective and heat resisting membrane to prevent erosion of the electrochromic layer by contact with the display electrolyte, comprising:
   (a) a substantially water insoluble carboxylic acid;
   (b) epoxy resin; and
   (c) a compound selected from at least one of amine and amide present in sufficient amount to form the respective amino or amido salt of the carboxylic acid, which salt together with the epoxy resin, imparts water repellency and ionic conductivity to the membrane, said amine or amide being present in less than the amount required to fully cure the epoxy resin so that with time and temperature only a minor, dispersed portion of said resin is cured.

22. In an electrochromic display of the type having an electrochromic layer adjacent an electrolyte, the combination of:
   (a) an aqueous acidified electrolyte comprising up to about 95% water, and
   (b) a protective membrane on the electrochromic layer, said membrane comprising a mixture of:
      (1) a substantially water insoluble carboxylic acid, and
      (2) a compound selected from at least one of amine and amide in effective amount to form the respective amino or amido salt with the carboxylic acid, which salt imparts water repellency and ionic conductivity to the membrane for minimizing contact between said electrochromic layer and electrolyte, while maintaining conductivity therebetween.

23. The display of claim 22 wherein the carboxylic acid is selected from the group consisting of adipic, dodecanedioic, lauric, stearic, palmitic and oleic acid.

24. The display of claim 23 wherein at least two substantially water insoluble carboxylic acids are employed in the membrane, one of which is oleic acid.

25. The display of claim 22 wherein the membrane mixture includes epoxy resin.

* * * * *